United States Patent [19]

Lamere

[11] Patent Number: 4,610,535
[45] Date of Patent: Sep. 9, 1986

[54] APPARATUS FOR REPRODUCING A COLORED SURFACE ON A PHOTOGRAPHIC EMULSION

[76] Inventor: Jean-Claude Lamere, Villaret, 1411 Essertines-sur-Yverdon, Switzerland

[21] Appl. No.: 759,100

[22] Filed: Jul. 25, 1985

[30] Foreign Application Priority Data

Jul. 27, 1984 [CH] Switzerland .................. 3643/84

[51] Int. Cl.$^4$ .................. G03B 27/32; G03B 27/52
[52] U.S. Cl. .................. 355/32; 355/52; 355/73; 355/74
[58] Field of Search .................. 355/32, 52, 72, 73, 355/74

[56] References Cited

U.S. PATENT DOCUMENTS

| | | | |
|---|---|---|---|
| 1,113,549 | 10/1914 | Franke | 355/72 |
| 3,286,586 | 11/1966 | Whitney | 355/72 |
| 4,320,965 | 3/1982 | Kimura et al. | 355/74 |
| 4,390,272 | 6/1983 | Anderson | 355/52 |
| 4,422,752 | 12/1983 | Thurm et al. | 355/32 |

*Primary Examiner*—Monroe H. Hayes
*Attorney, Agent, or Firm*—Frost & Jacobs

[57] ABSTRACT

An apparatus for reproducing at least one colored surface on a photographic emulsion. The apparatus consists essentially of a sensitometer 10, a mask 11 which is movable with respect to the top surface of the sensitometer, an exposure unit comprising a light source 12 and a filter box 13, and a central control unit 14 in the frame 9 of the sensitometer, equipped with a keyboard 15 for selecting references on a color chart, a series of function control keys 16 and a display screen 17. It allows the reproduction by controlled color synthesis of all color tones listed on a color chart.

18 Claims, 7 Drawing Figures

APPARATUS FOR REPRODUCING A COLORED SURFACE ON A PHOTOGRAPHIC EMULSION

FIELD OF THE INVENTION

The present invention relates to the reproduction of coloured surfaces on photographic emulsions by controlled synthesis of colours corresponding to selected references on a colour chart, and more particularly to an apparatus for reproducing at least one coloured surface whose colour corresponds to a selected reference on a colour chart, this surface being obtained by controlled synthesis of colours on a given photographic emulsion.

SUMMARY OF THE INVENTION

The apparatus according to the invention comprises: an exposure unit with a light source arranged to selectively provide light of three primary colours; a sensitometer with a tray for carrying a substrate coated with a photographic emulsion, a mask for selectively covering the emulsion and a mechanism for displacing the mask relatively to the emulsion; and a central control unit with a keyboard for selecting references of the colour chart, means for controlling the exposure unit and means for controlling said mechanism for displacing the mask.

The apparatus according to the invention as set forth in the claims is characterized more particularly in that it comprises a rotatable sensitometer tray associated with a suction device arranged to maintain said substrate coated with the photographic emulsion on said tray, a mask comprising a movable screen arranged for displacement in one direction and provided with an elongated exposure window which is substantially perpendicular to this direction and has a length such that this window may scan the entire surface of the photographic emulsion during displacement of the screen, a movable shutter associated with said mask and arranged for displacement in a direction parallel to the displacement of the screen, so that said shutter may selectively cover and occlude the exposure window, and an exposure unit comprising a filter box including three movable filters which correspond respectively to the three primary colours and are associated with a mechanism arranged to allow said filters to be selectively inserted between the light source and said exposure window of the mask.

The main features and advantages of the present invention may be understood more fully with reference to the following description of an example illustrating a preferred embodiment shown in the accompanying drawings.

DESCRIPTION OF THE PREFERRED EMBODIMENT

Figure 1:
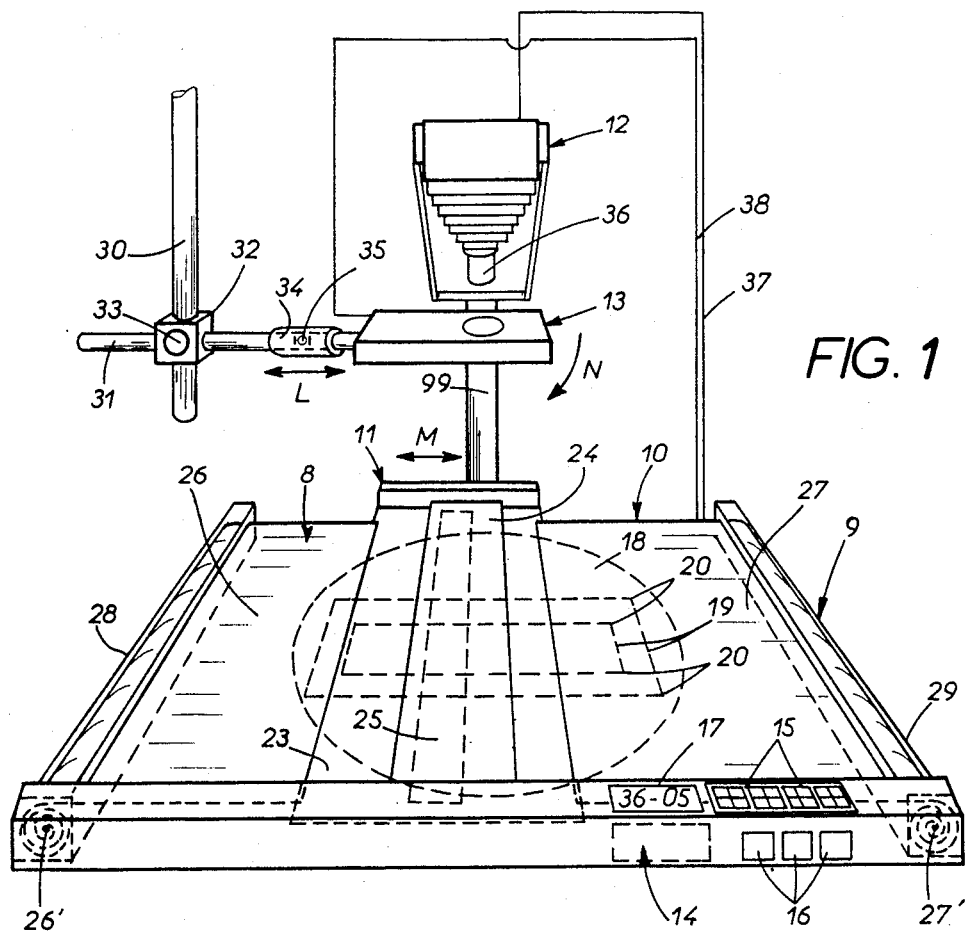
FIG. 1 represents a schematic perspective view of the apparatus according to the preferred embodiment of the invention.

With reference to FIG. 1, the apparatus consists essentially of a sensitometer 10, a mask 11 movable laterally with respect to the top surface of the sensitometer, an exposure unit comprising a light source 12 and a filter box 13, and a central control unit 14 incorporated in the frame 9 of the sensitometer and provided with a keyboard 15 for selecting the references of the colour chart, a series of function control keys 16 and a display screen 17.

Figure 6:
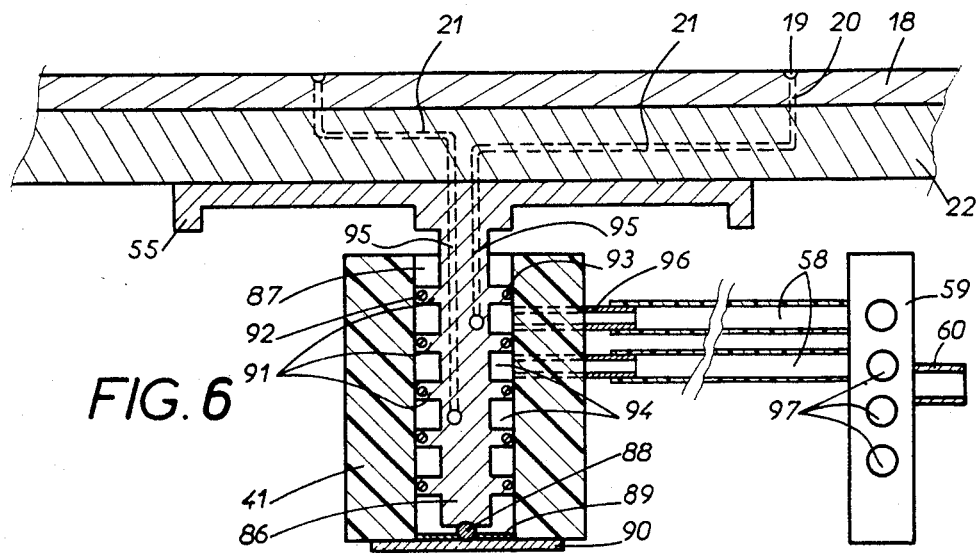
FIG. 6 is an axial cross-section illustrating the suction device associated with the sensitometer tray.

The frame 9 of the sensitometer 10 has a substantially rectangular shape and supports a horizontal tray 8 provided with a central circular opening in which a circular rotatable plate 18 is mounted to receive a substrate coated with a photographic emulsion. The top surface of the plate 18 is provided with a rectangular network of shallow grooves 19, with parallel sides corresponding substantially to, and preferably having dimensions slightly smaller than those of the various formats of substrates with a sensitive layer which may be utilized on this apparatus. Each of these grooves 19 communicates with a channel 20 traversing plate 18 and communicating, as shown in FIG. 6, with a conduit 21 provided within a rectangular plate 22 which is associated with the rotatable circular plate 18 in such a manner that both may rotate at the same time.

The mask 11 consists of a movable screen 23 which is displaced in the direction of the double arrow M (FIG. 1) and a movable shutter 24 which is displaced in the same direction, so as to partially or completely mask an elongated window 25 which is provided in the screen 23, perpendicular to the direction of displacement M of the screen and the shutter.

Two sliding diaphragms 26 and 27, with automatic winding spindles 26' and 27', are fixed laterally to the screen 23 so that they always cover those parts of the horizontal tray 8 which are not covered by the screen 23, in every position of this screen. The winding spindles 26' and 27' are respectively accomodated in two lateral members 28 and 29 of the frame 9 of the sensitometer 10. These diaphragms 26 and 27 are advantageously fixed to the lateral edges of the screen 23 by bent or hook-shaped sections which allow rapid coupling or uncoupling without requiring any tools.

Figure 7:
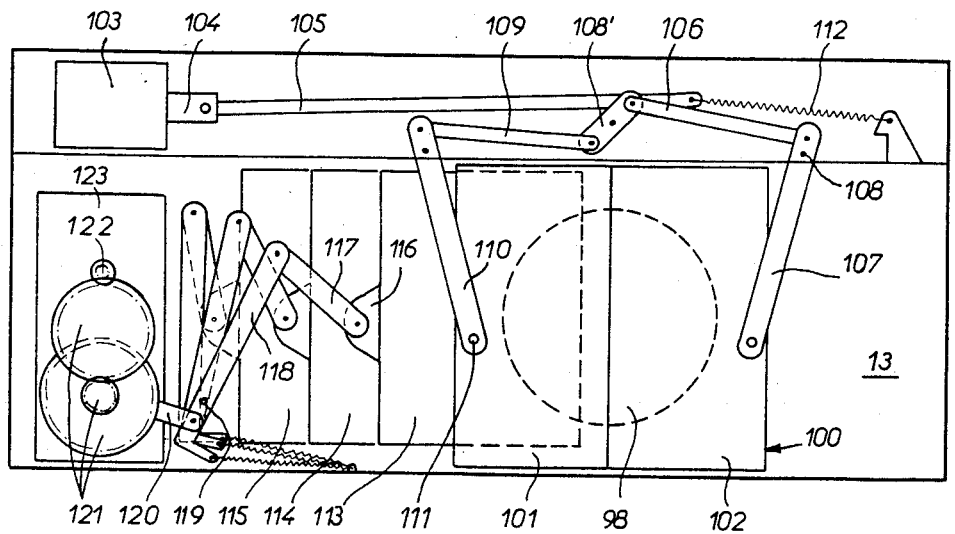
FIG. 7 is a bottom view of the filter box associated with the light source.

The filter box 13 which will be described in more detail with reference to FIG. 7, is mounted on a support comprising a vertical fixed post 30 and a horizontal bar 31 connected thereto by a connecting cube 32 provided with a locking screw 33 which allows the position to be adjusted in a single operation of the connecting cube movable along the column 30 and the horizontal bar 31. A sliding sleeve 34 is movable in the direction of the double arrow L and allows the filter box 13 to be folded down in the direction of the arrow N about a joint 35 which connects the two sections constituting the horizontal bar 31. This system of fixation allows the filter box 13 to be withdrawn from the field of the light source 12 or the position of this filter box to be adjusted with respect to the objective 36 of this source. Two schematically represented lines 37 and 38 illustrate the connection between the central control unit 14 and the light source 12 on one hand, and between this central control unit and the filter box 13 on the other hand.

Figure 2:
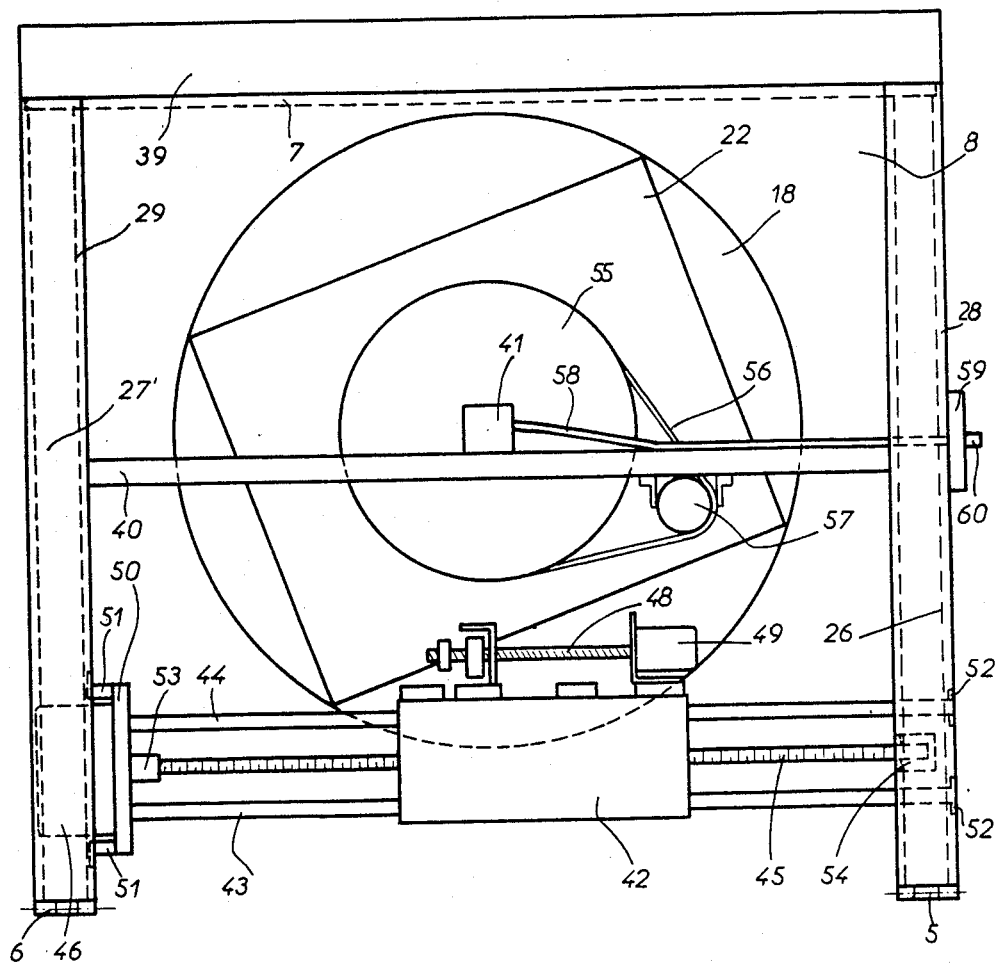
FIG. 2 represents a bottom view of the sensitometer.

As is shown in FIG. 2, the sensitometer tray 8, viewed from below, is carried by the two lateral frame members 28 and 29, connected at one end by a section 39, in which the central control unit 14, the selection keyboard 15, the function control keys 16 and the display screen 17 are mounted, while these members are connected in their central part by a cross-piece 40 which carries a suction block 41 serving as a support for the axle of the rotatable circular plate 18.

Figure 5:
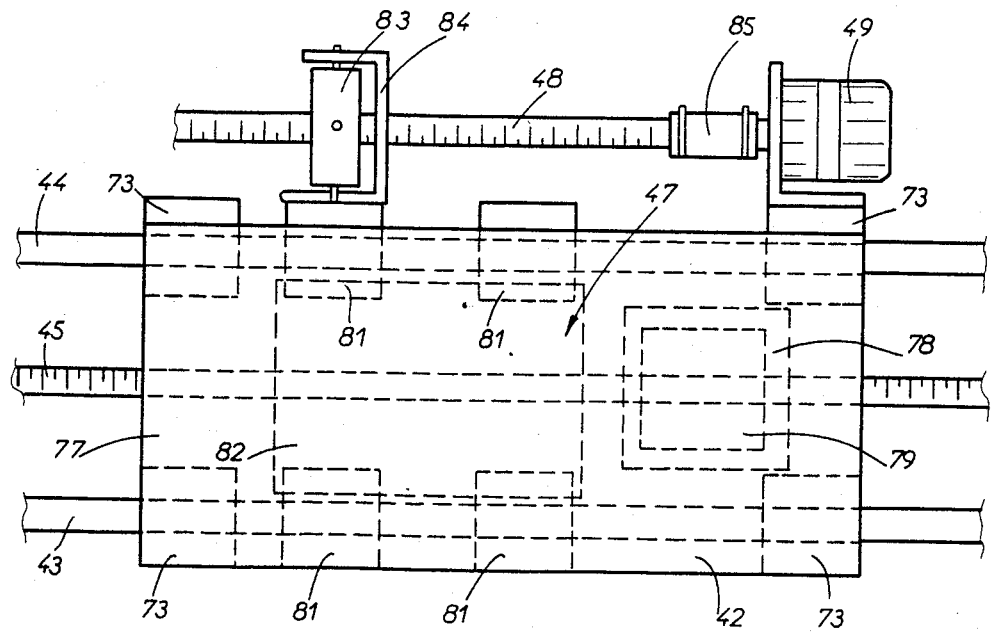
FIG. 5 is a plan view illustrating the drive mechanism of the movable screen and the shutter constituting the mask of the sensitometer.

The other ends of the two lateral frame members 28 and 29 are connected by a drive mechanism designed to provide independent displacement of the screen 23 and the shutter 24 in the direction of the double arrow M. This drive mechanism is illustrated in FIG. 5 and consists essentially of a movable slide 42 which is arranged for displacement on two parallel guide rods 43 and 44 by means of a rotating screw 45 disposed parallel to the guide rods 43, 44 and driven by a motor 46. This slide 42 is connected to the mask 23 and carries a movable guide block 47 which is likewise arranged for displacement on the two guide rods 43 and 44 by means of a rotatable screw 48 which is driven by a motor 49 mounted on the slide 42.

The two rods 43 and 44 are fixed at one of their ends on a mounting plate 50 (FIG. 2) which is connected by fixing members 51 to the frame member 29 and likewise carries the motor 46 that drives the screw 45. The other ends of the guide rods 43 and 44 are directly fixed, by suitable members 52 such as a nut for example, to the member 28 of the sensitometer frame. One of the ends of the screw 45 is made fast with the output shaft 53 of the motor 46, while the other end of this screw is carried by a bearing 54 fixed to the frame member 28.

As is likewise shown in FIG. 2, the rectangular plate 22, which is fixed to the lower surface of the circular rotatable plate 18, is connected to a drive wheel 55 which is coupled by means of a belt 56, preferably serrated, to a drive wheel of a motor 57 carried by the cross-piece 40.

The suction block 41, which will be described more fully with reference to FIG. 6, is connected by tubes 58 to a valve block 59 having a pipe 60 arranged for connection to a vacuum pump (not shown).

Figure 3:
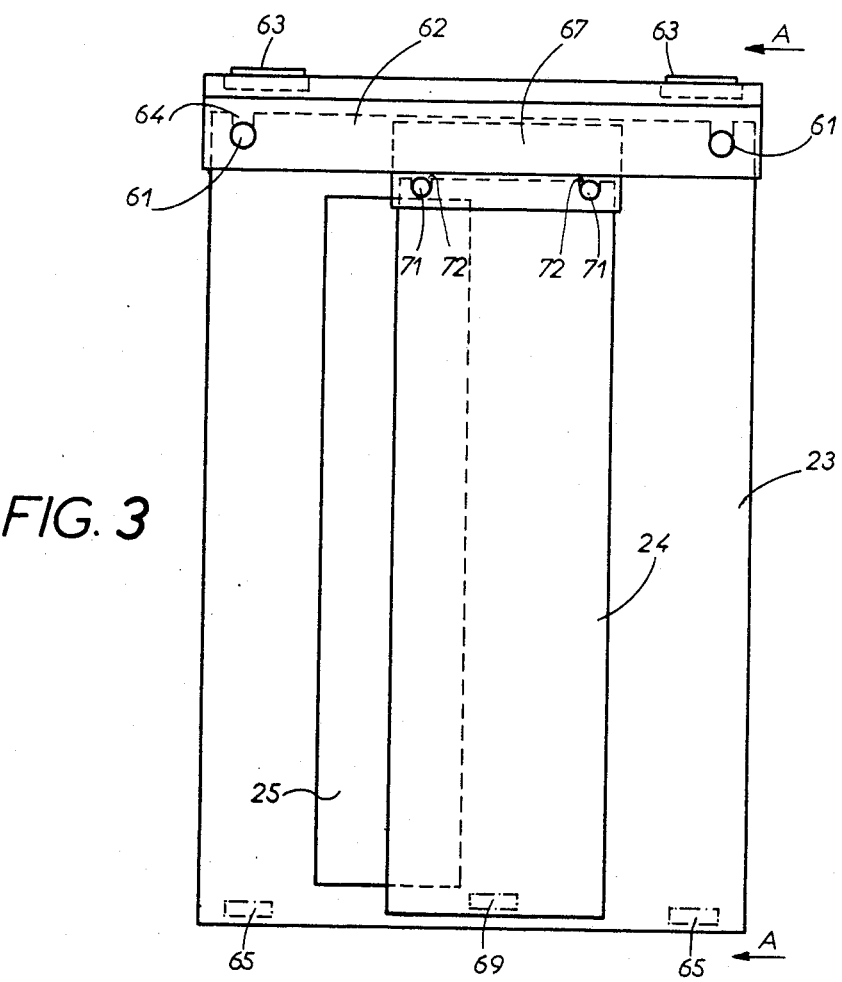
FIG. 3 represents a plan view of the sensitometer.

FIG. 3 shows the mask of the sensitometer, seen from above. As previously mentioned, this mask comprises the screen 23 provided with the elongated window 25 and the shutter 24 whose dimensions are such that it can partially or totally cover and occlude the window 25.

The screen 23 consists of a substantially rectangular plate which is attached by screws 61 to a support 62 connected by clamps 63 to the slide 42 shown schematically in FIG. 2 and described in more detail with reference to FIG. 4. The screws 61 permit rapid assembly of the screen and its support 62 by means of notches 64 provided on the edge of the rectangular screen plate. Two rollers 65 are partially countersunk in a U-shaped section 66 and serve to support the mask 23 on the top surface of a side member 7 connecting the winding spindles 26', 27' joined to the frame members 28, 29 by means of hinges 5 and 6 (FIG. 2).

The shutter 24 likewise consists of a substantially rectangular plate, which has a width larger than that of the window 25. This plate is carried by a support 67 connected by means of clamps 68 to the guide block 47 (see FIG. 5). At its front end, the shutter plate 24 is likewise equipped with a roller 69, which is partially countersunk in a U-shaped section 70 and allows this shutter to be displaced with slight friction on the upper surface of the mask 23. The shutter plate 24 is connected to its support 67 by screws 71 which engage in grooves 72 provided along the top side of the shutter plate.

Figure 4:
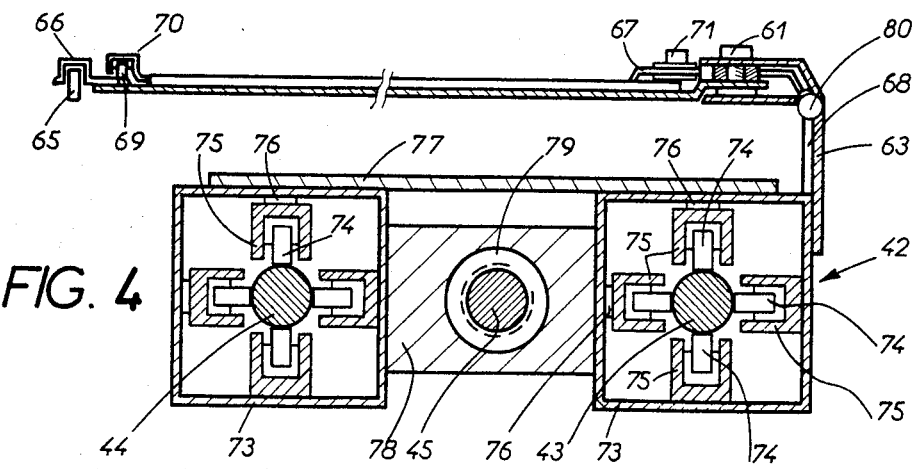
FIG. 4 represents a cross-section along line A—A of FIG. 3, illustrating the mask and a part of the mechanism for its displacement on the sensitometer tray.

FIG. 4 illustrates more particularly the structure of the movable slide 42 which consists essentially of four elements 73 formed of square sections wherein four bearing rollers 74 respectively carried by U-shaped sections 75 are mounted, these sections each being fixed to one of the inner faces of the elements 73. The rollers 74 thus each have a single bearing point on the corresponding guide rod 43 or 44 so that the friction during displacement of the slide 42 is reduced to a minimum. To provide constant support of the rollers on the guide rods, two adjacent sections 75 are rigidly mounted against corresponding sides of the element 73, while the other two sections 75 are connected to the corresponding sides by means of leaf springs 76. The four elements 73 are connected by a rectangular plate 77.

A block 78 mounted between two neighbouring elements 73 serves as a support for a threaded nut 79 which is engaged with the screw 45 driven by the motor 46.

To permit easy access to the circular rotatable plate 18, the support 62 of the screen 23, as well as the support 67 of the shutter 24, are connected to their respective clamps 63 and 68 by means of hinges 80.

FIG. 5 illustrates in a more detailed fashion the relative arrangement of the slide 42 and the guide block 47. The guide block 47 likewise comprises in the represented embodiment four elements 81 which are substantially similar to the elements 73 supporting the plate 77 of the slide. These four elements are connected and maintained in position by a plate 82 of rectangular or square shape. These four elements 81 may be replaced by two elements each comprising two series of four rollers whose function is identical to that of the four rollers included in each of the elements 81.

The guide block is displaced on the two guide rods 43 and 44 and its movement is limited by the spacing of two elements 73 of the same guide rod. This displacement of the guide block 47 is effected by means of a motor 49 which drives a screw or threaded spindle 48 and acts on a nut 83 universally mounted on a bracket 84. The connection between the output shaft of motor 49 and the screw 48 is achieved by means of a flexible collar 85.

Given that the motors 46 and 49 for respectively displacing the slide 42 and the guide block 47 are controlled individually and independently by the central control unit 14 and that the slide 42 is connected to the screen 23, while the guide block 47 is connected to the shutter 24, the screen and the shutter may be displaced independently of each other to permit precise adjustment of the window opening and positioning.

FIG. 6 essentially illustrates the suction block 41 which allows the substrate coated with a sensitive emulsion to be maintained in position against the top surface of the circular rotatable plate 18 of the sensitometer. The axle 86 of the wheel 55 is seated in a cylindrical bore 87 of block 41 and rests on a ball 88 held by a washer 89 and a circular sealing disk 90. The axle itself is provided with a number of parallel ribs 91 which each comprises a circular peripheral groove 92 provided with an O-ring seal 93 for ensuring tightness between the cavities 94 defined between the ribs 91. The solid central core of the axle 86 comprises several small channels 95 traversing the hub of the wheel 55 and communicating respectively with the internal conduits 21 provided within the rectangular plate 22 for communication with the channels 20 traversing the circular plate 18 and opening respectively into the bottom of the shallow grooves 19. Each of the annular cavities 94 communicates with a pipe 96 connected by means of a tube 58 to the block of valves 59 controlled individually by the mobile tappets 97, which are provided for communication of one or several of the tubes 58 with a vacuum pump (not shown).

This arrangment allows the substrate with a sensitive emulsion disposed on the tray of the sentitometer to be set in position in a particularly simple and effective manner.

The filter box represented in FIG. 7 has the advantage of being particularly compact and is in any case much more compact than filters mounted on rotatable supports of the carroussel type. The box 13 itself presents the form of a rectangular parallelepiped whose top and lower surfaces are each pierced with a circular opening 98 allowing the passage of light emitted by a light source 12 and concentrated by an objective 36.

This light source 12 and the objective 36 preferably consist of a photographic enlarger of professional type mounted on a post 99. The two openings 98 may be closed off by a shutter 100 comprising two sliding diaphragms 101 and 102 whose opening and closing are controlled by an electromagnet 103. The rod 104 integral with the electromagnet plunger is connected to a rocker bar 105, which is connected on one hand to a rod 106 which actuates an arm 107 pivoting around an axis 108 and fixed to the diaphragm 102 and, on the other hand, to a return swing 108' connected to a rod 109 hinged to an arm 110, pivoting about an axis 111 and connected to the diaphragm 101 of the shutter 100. A return spring 112 is fixed to the rocker bar 105. This mechanism allows the two diaphragms 101 and 102 of the shutter to be rapidly opened and closed.

The filters 113, 114 and 115 consist of plane filter plates which may be laterally displaced in such a manner as to be inserted between the two openings 98 of the two large parallel surfaces of the box 13. Each filter comprises a fixing clamp 116, to which is fixed a rocker bar 117 hinged to an arm 118 pivoting around an axis 119 and attached to a rod 120 integral with a cam (not shown) driven by a gear train 121 actuated by the output pinion 122 of a drive motor housed in a casing 123. Displacement of the filters 13, 114 and 115, as well as opening and closing of the shutter 100, are controlled by the central control unit 14.

The constructive solutions provided according to the invention have made it possible to realize an effective and reliable apparatus which is relatively compact and provides a relatively simple solution of the problems involved in the reproduction of coloured surfaces by controlled colour synthesis on a given photographic emulsion. The system more particularly allows the reproduction of colour tones between any two references of the colour chart.

To reproduce a given colour, one effects one or several exposures of the photographic emulsion to one or several primary colours obtained by means of the filters contained in the filter box, namely: by opening the window, during a first phase, by displacing the shutter 24, the screen 23 being stationary, by displacing the screen and the shutter simultaneously and at the same speed during a second phase, in such a manner as to maintain the opening of the window constant, then by displacing the screen, during a third phase, while maintaining the shutter stationary in such a manner as to occlude the window. One obtains a constant exposure in this manner which results in the reproduction of a uniform colour with no shading.

Positive shading is obtained by replacing the second phase in the described mode of operation by a second phase during which the shutter and the screen are displaced simultaneously in the same direction, but in such a manner that the width of the window is increased progressively. This may be easily achieved by providing the motors 46 and 49 as step motors which receive drive pulses from the central control unit 14. To achieve negative shading, this phase is replaced by a second phase during which the screen and the shutter advance simultaneously in the same direction, but in such a manner that the opening of the window is decreased progressively.

The utilization of a very complete colour chart comprising several hundred references makes it possible to reproduce, by controlled colour synthesis, any colour tones which may be desired.

Access to the sensitometer tray may be facilitated by providing a pivotable frame, which supports the two winding spindles 26', 27' and comprises the side member 7 that connects two corresponding ends of these spindles, and by providing a return spring (not shown), accomodated for example in the members 28 and 29 of the frame 9, which allow pivoting, with practically no effort, of the sensitometer shutter assembly comprising the screen 23, the shutter 24 and the lateral diaphragms 26, 27.

It is understood that other embodiments of the invention may be imagined. The box 13 may more particularly be equipped with a telescopic support rod allowing it to be written out of the field of the objective 36 by axial displacement in the direction of the arrow L, instead of pivoting according to arrow N as described.

The shallow grooves of the circular rotatable plate may moreover be replaced by suction holes distributed over the entire surface according to given arrangements corresponding to the formats of the substrates with a sensitive coating which are used.

The number of function control keys and the arrangement of the selection keyboard may likewise be modifed according to the intended requirements and utilization.

What is claimed is:

1. An apparatus for reproducing a coloured surface on a photograpic emulsion by controlled synthesis of colours corresponding to a reference selected on a colour chart, the apparatus comprising an exposure unit with a light source arranged to emit light corresponding to three primary colours, a sensitometer with a tray for carrying a substrate coated with a given photographic emulsion, a mask for covering this emulsion and a drive mechanism for displacing the mask relatively to this emulsion, and a central control unit with a keyboard for selecting the references of the colour chart, with means for controlling the exposure unit and with means for controlling the drive mechanism for displacement of the mask, wherein the sensitometer tray is rotatable and comprises a suction device for maintaining the substrate coated with the photographic emulsion on this tray, the mask comprises a screen which is movable in one direction, is provided with an elongated exposure window, substantially perpendicular to this direction, and whose length is such that the window may entirely scan the photographic emulsion during displacement of the screen, and a shutter which is movable for displacement in the same direction as the displacement of the screen and is capable of selectively covering the exposure window, and the exposure unit comprises a filter box containing three movable filters which correspond to said three primary colours and are associated with a mechanism allowing their displacement so that these filters may be selectively inserted between the light source and the exposure window of the mask.

2. The apparatus according to claim 1 wherein the sensitometer tray comprises a circular rotatable plate having a top surface with a network of shallow grooves connected to at least one channel in said plate, which is connected to a suction block arranged for connection to a vacuum pump.

3. The apparatus according to claim 2 wherein said shallow grooves are arranged in the form of a network of rectangular frames disposed within one another with their respective sides being disposed parallel to one another and having dimensions slightly smaller than the standard format of the substrates carrying a photographic emulsion, each of said frames communicating with a corresponding channel traversing said plate, each said channel being connected to a corresponding conduit within said suction block, and each said conduit being associated with a selecting valve whereby it may be independently connected to the vacuum pump.

4. The apparatus according to claim 3, wherein said circular rotatable sensitometer plate is associated with a support plate connected to a drive wheel having an axle seated in a central bore of said suction block, and wherein the axle of said drive wheel comprises a series of ribs defining annular cavities each communicating on one hand with a shallow groove and on the other hand with a selecting valve for connection to the vacuum pump.

5. The apparatus according to claim 2 wherein said circular rotatable sensitometer plate is associated with a support plate connected to a drive wheel having an axle seated in a central bore of said suction block.

6. The apparatus according to claim 5 wherein the axle of said drive wheel comprises a series of ribs defining annular cavities each communicating on one hand with a shallow groove on said circular plate and on the other hand with a selecting valve for connection to the vacuum pump.

7. The apparatus according to claim 1 wherein two sliding diaphragms are arranged on either side of said mask so as to always cover those parts of the sensitometer tray which are not covered by the mask.

8. The apparatus according to claim 7 wherein said sliding diaphragms each comprise a winding spindle accomodated in a corresponding lateral member of a frame of the sensitometer, said diaphragms having free ends fixed to the lateral edges of the screen of the sensitometer mask.

9. The apparatus according to claim 1 wherein said screen of the sensitometer mask is integral with a slide which is movable in a direction perpendicular to the window of the mask and the shutter of said mask is integral with a guide block which is movable in a direction parallel to said direction of movement of said slide.

10. The apparatus according to claim 9 wherein said screen is integral with a support connected to said guide block by means of at least one hinge.

11. The apparatus according to claim 9 wherein said shutter is integral with a support connected to said movable guide block by means of at least one hinge which is coaxial with that of the support of the screen.

12. The apparatus according to claim 9 wherein said guide block and said slide are mounted for displacement along two parallel guide rods.

13. The apparatus according to claim 12 wherein said slide is arranged for displacement by means of a motor engaged with a rotating screw parallel to said guide rods.

14. The apparatus according to claim 12 wherein said guide block is arranged for displacement by means of a motor carried by the slide and coupled with a rotating screw parallel to said guide rods.

15. The apparatus according to claim 12 wherein said slide comprises at least four bearing elements which are respectively associated with said guide rods and each comprises four rollers disposed for rotation at 90° with respect to two neighbouring rollers, so that each of said four rollers has a single point of contact with a corresponding guide rod.

16. The apparatus according to claim 15 wherein said bearing elements each comprise a tubular section having a square cross-section, each roller is carried by a U-shaped support fixed on a corresponding inner side of the tubular section, two supports of adjacent rollers are rigidly mounted on corresponding sides of the tubular section, while the supports of the two other rollers are respectively mounted by means of a compression spring.

17. The apparatus according to claim 1 wherein said screen and said shutter each comprise at least one support roller mounted at the free end thereof.

18. The apparatus according to claim 1 wherein said filter box comprises a shutter with sliding diaphragms, three movable filters and a cam mechanism for providing selective displacement of the filters in front of an opening provided in said box.

* * * * *